(12) United States Patent
Ryu et al.

(10) Patent No.: US 6,365,707 B1
(45) Date of Patent: Apr. 2, 2002

(54) POLYMERIZABLE COMPOSITION AND PROCESS FOR PRODUCING OPTICAL RESIN COMPRISING THE SAME

(75) Inventors: Akinori Ryu; Seiichi Kobayashi; Hiroyuki Morijiri; Chitoshi Shimakawa, all of Fukuoka; Koju Okazaki, Chiba; Yoshinobu Kanemura; Nobuo Kawato, both of Fukuoka, all of (JP)

(73) Assignee: Mitsui Chemicals, Inc. (JP)

( * ) Notice: Subject to any disclaimer, the term of this patent is extended or adjusted under 35 U.S.C. 154(b) by 0 days.

(21) Appl. No.: 09/584,105

(22) Filed: May 31, 2000

(30) Foreign Application Priority Data

Jun. 3, 1999 (JP) ............................................ 11-156657
Nov. 30, 1999 (JP) ............................................ 11-340047

(51) Int. Cl.$^7$ .......................... C08G 75/00; C08L 63/00
(52) U.S. Cl. ...................... 528/373; 528/403; 523/400; 252/405; 252/406; 252/407
(58) Field of Search .......................... 528/373; 523/400, 523/403; 252/405, 406, 407

(56) References Cited

U.S. PATENT DOCUMENTS 6,204,311 B1 * 3/2001 Morijiri et al. ............. 528/400

* cited by examiner

*Primary Examiner*—Duc Truong
(74) *Attorney, Agent, or Firm*—Burns, Doane, Swecker & Mathis, LLP

(57) ABSTRACT

A polymerizable composition according to the present invention is characterized by that it comprises a compound (a) having at least one structure represented by the following formula (1):

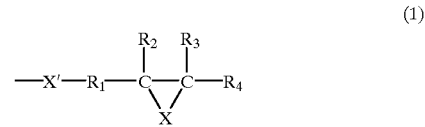

(1)

wherein $R_1$ is a divalent hydrocarbon group having 1 to 10 carbon atoms, $R_2$, $R_3$ and $R_4$ each independently represents a hydrocarbon group having 1 to 10 carbon atoms or a hydrogen atom; X stands for an S or O atom and the average number of S atom is at least 50% based on the total number of S and O atoms which consist of the three membered ring; and X' is —S— or —O—, at least two compounds (b) having a tertiary amino group substituted with aliphatic and/or aromatic group(s), which are each different in catalytic activity as a polymerization catalyst, with the proviso that the ratio of the total of the tertiary amino groups in the at least two compounds (b) to the episulfide groups in compound (a) is in the range of 0.0001 to 0.02 in terms of a molar ratio of amino/episulfide functional group.

9 Claims, No Drawings

POLYMERIZABLE COMPOSITION AND PROCESS FOR PRODUCING OPTICAL RESIN COMPRISING THE SAME

BACKGROUND OF THE INVENTION

1. Field of the Invention

This invention relates to a resin used for optical materials such as plastic lenses, prisms, optical fibers, information recording substrates, filters and light emitting diodes and also to a polymerizable composition which serves as a raw material of the resin. In particular, the invention relates to a polymerizable composition suited as a raw material for eyeglass plastic lenses.

2. Description of the Related Art

Plastic lenses are lightweight and non-brittle compared with inorganic glass lenses, and dyeable, and are therefore rapidly prevailing in the areas of optical devices such as eyeglass lenses and camera lenses in recent years. The plastic lenses have been required to have a high refractive index and a high Abbe number as optical performances and to have high heat resistance, a low specific gravity and processability as physical properties.

Among these performances, the requirement for a high heat resistance and low specific gravity have been satisfied on a high level in high-refractive-index plastic lenses produced at present. Resins widely employed these days for such purposes include a radical polymerization product of diethylene glycol bis(allylcarbonate) (which will hereinafter be abbreviated as "D.A.C."). This resin has various advantages such as excellent impact resistance, lightweight, superb tintability, and good processability such as good cutting and grinding machinability. Its refractive index, however, is about 1.50 nd so that the peripheral thickness inevitably becomes large. There is accordingly a desire for the development of a lens resin having a still higher refractive index.

As a resin imparted with a higher refractive index than the D.A.C. resin, known is a polythiourethane resin (Japanese Patent Publication No. 58489/1992) having a sulfur atom introduced into the resin, a sulfur-containing O-(meth)acrylate resin (Japanese Patent Laid-Open No. 16140/1992) or a thio(meth)acrylate resin (Japanese Patent Publication No. 59060/1991). The polythiourethane resin is well balanced with a high refractive index and good impact resistance.

It is however very difficult to improve both refractive index and Abbe number simultaneously, because these physical properties are contrary to each other and the Abbe number decreases with a rise in the refractive index. Heightening of the refractive index while suppressing a reduction in the Abbe number is therefore studied briskly.

Among various studies, one of the most typical proposals is for a high-refractive-index lens resin using an episulfide compound, for example, in Japanese Patent Laid-Open Nos. 110979/1997, 71580/1997, 255781/1997, 2982878/1998, 166037/1999, WO89/10575, 140070/1999, 183702/1999, and 189592/1999 or Japanese Patent Application No. 68448/1999.

The process as described in such a literature makes it possible to provide a resin having a high refractive index while maintaining a relatively high Abbe number. When a resin is prepared by any one of the above-described processes, however, the pot life of the monomer is not sufficient upon polymerization, which prevents smooth polymerization work; or considerable heat released upon polymerization happens to cause yellowing or burning of the resin or polymerization runaway. A post-heating step such as annealing also happens to cause yellowing of the resin. In the industrial production of lenses, a yield of 90% or greater is generally required. In the small-quantity production of lenses using an episulfide compound, it is relatively easy to suppress heat release upon polymerization. Upon mass production of lenses, on the other hand, it is difficult to completely control the polymerization for all the lenses and thermal unevenness appears in some of the lenses during polymerization, leading to formation of optical inhomogeneity (which will hereinafter be called "striae") in these lens thus obtained. Owing to striae, a yield of the lenses sometimes lowers.

SUMMARY OF THE INVENTION

An object of the present invention is therefore to provide a polymerizable composition imparted with a sufficiently long pot life and capable of controlling the heat release upon polymerization; and a resin available therefrom, which is reduced in yellowing upon heating and improved in the hue while having a high refractive index and a high Abbe number, and has effects, when used for the production of lenses, for suppressing the formation of striae inside of the lenses, thereby preventing a yield lowering which otherwise occurs due to striae.

With the foregoing in view, the present inventors have carried out an extensive investigation in order to attain the above-described object. As a result, it has been found that the polymerizable composition according to the present invention is equipped with sufficiently long pot life; and the resin available therefrom is, while having a high refractive index and well-balanced Abbe number, reduced in yellowing upon heating and improved in the hue owing to suppression of heat release upon polymerization, and has effects, in the mass- production of lenses, for suppressing the formation of striae inside of the lenses, thereby preventing a yield lowering, which otherwise occurs due to striae, leading to completion of the present invention.

The present invention therefore provides:

(A) a polymerizable composition comprising a compound
 (a) having at least one structure represented by the following formula (1):

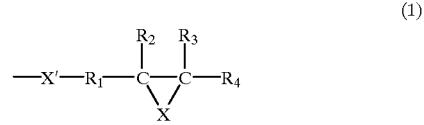

(1)

wherein $R_1$ is a divalent hydrocarbon group having 1 to 10 carbon atoms, $R_2$, $R_3$ and $R_4$ each independently represents a hydrocarbon group having 1 to 10 carbon atoms or a hydrogen atom; X stands for an S or O atom and the average number of S atom is at least 50% based on the total number of S and O atoms which consist of the three membered ring; and X' is —S— or —O—, at least two compounds (b) having a tertiary amino group substituted with aliphatic and/or aromatic group(s) which are each different in catalytic activity as a polymerization catalyst, with the proviso that the ratio of the total of the tertiary amino groups in the at least two compounds (b) to the episulfide groups in the compound (a) is in the range of 0.0001 to 0.02 in terms of a molar ratio of amino/episulfide functional group, (B) the polymerizable composition of (A), wherein the compound (a) has at least one structure represented by the following formula (2):

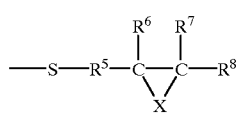

(2)

wherein, $R^5$ represents a divalent hydrocarbon group having 1 to 10 carbon atoms, $R^6$, $R^7$ and $R^8$ each independently represents a hydrocarbon group having 1 to 10 carbon atoms or a hydrogen atom, and X stands for an S or O atom, the average number of the S atom being at least 50% based on the total number of S and O atoms which constitute the three-membered ring, (C) the polymerizable composition of (A), wherein the compound (a) is represented by the following formula (3):

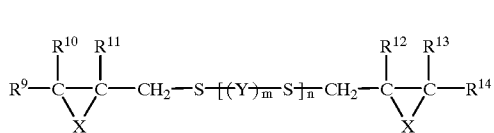

(3)

wherein, $R^9$ to $R^{14}$ each independently represents a hydrocarbon group having 1 to 10 carbon atoms or a hydrogen atom, Y represents a substituted or unsubstituted, linear or branched divalent hydrocarbon group having 1 to 10 carbon atoms, a substituted or unsubstituted 1,4-dithian group or an arylene group, m stands for an integer of 0 to 2, n stands for an integer of 0 to 4, and Xs each stands for an S or O atom, (D) the polymerizable composition of (A), wherein the compound (a) is represented by the following formula

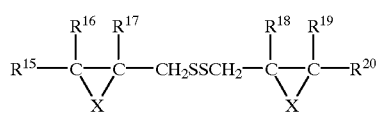

(4)

wherein, $R^{15}$ to $R^{20}$ each independently represents a hydrocarbon group having 1 to 10 carbon atom or a hydrogen atom, and Xs each stands for an S or O atom, (E) the polymerizable composition of (A), wherein the at least two compounds (b) used as a polymerization catalyst and different each other in catalytic activity are at least two compounds selected, respectively, from compounds having high catalytic activity consisting of N,N-dimethylcyclohexylamine and N,N-diethylethanolamine and those having low catalytic activity consisting of N,N-diisopropylethylamine and N-methyldicyclohexylamine, (F) a resin obtained by heat curing the polymerizable composition of (A), (G) a process for producing a resin, which comprises heat curing the polymerizable composition of (A), (H) an optical material comprising the resin of (F), (I) a process for producing an optical material, which comprises casting polymerization of the polymerizable composition of (A), (J) a polymerizable composition comprising a compound (c) represented by the following formula (5):

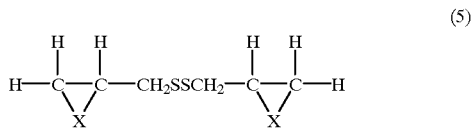

(5)

wherein, Xs each represents an S or O atom and they may be the same or different, and at least one compound (d) having a tertiary amino group substituted with aliphatic and/or aromatic group(s), with the proviso that the ratio of the tertiary amino group in the compound (d) to the episulfide group in the compound (c) is in the range of 0.0001 to 0.02 in terms of a molar ratio of an amino/episulfide functional group, (K) the polymerizable composition of (J), wherein the compound (d) is one or more than one compound selected from the group consisting of N,N-diisopropylethylamine, N,N-dimethylcyclohexylamine and N-methyldicyclohexylamine, (L) a resin obtained by heat curing the polymerizable composition of (J), (M) a process for producing a resin, which comprises heat curing the polymerizable resin composition of (J), (N) an optical material comprising the resin of (L), and (O) a process for producing an optical material, which comprises cast polymerizing the polymerizable composition of (J).

It is possible to judge whether at least two compounds (b) having a tertiary amino group differ in catalytic activity or not, for example, by the following method.

(1) As the compound (a) which serves as a standard compound, bis(β-epithiopropyl) disulfide is selected and it is mixed with one compound (b) having a tertiary amino group so that an amino group/episulfide group ratio (molar ratio of a functional group) becomes 0.0025. From the viscosity of the mixture rightly after completion of mixing at 20° C. and that of the mixture 3 hours after mixing, a change in the viscosity was studied. At the same time, the resulting mixture was heated from 30 to 80° C. over 10 hours and heat release starting time and ultimate temperature by heat release were studied.

(2) With regards to various compounds (b) having a tertiary amino group, a change in the viscosity was studied in a similar manner to (1).

(3) Any two compounds (b) are selected and they are compared in a change in viscosity, heat release starting temperature and ultimate temperature by heat release. When these two compounds agree in at least one condition, among three conditions, that is, a difference in the change in viscosity not less than 50 mPa.s, a difference in the heat release starting time not less than 2 hours, and a difference in the ultimate temperature by heat release not less than 30° C., these two compounds (b) are regarded to differ in catalytic activity.

The present invention makes it possible to provide a polymerizable composition having a sufficiently long pot life, which was not actualized by the conventional technique, and capable of suppressing heat release upon polymerization; and also a resin, which is obtained by curing and polymerizing the composition, improved in hue and reduced in yellowing upon post-heating while having a high refractive index and well-balanced Abbe number. In addition, according to the present invention, formation of striae inside of lenses can be suppressed upon mass production of the lenses, whereby a lowering in a yield due to striae can be prevented. The effects for preventing a lowering in a yield, which otherwise occurs by the striae, are particularly eminent when at least two compounds (b) having a tertiary amino group different in catalytic activity are employed as a polymerization catalyst.

As a result, the pot life of the polymerizable composition can be maintained long, yellowing due to heating can be reduced without impairing a high refractive index, a transparent resin with good hue becomes available by suppressing heat release upon polymerization, and a lowering in an yield due to striae can be prevented. The elongation of the pot life leads to an improvement in the working efficiency upon resin production and the resin thus available contributes to the production of thin and fashionable lenses, particularly in the field of eyeglass lenses.

DETAILED DESCRIPTION OF THE PREFERRED EMBODIMENTS

The present invention will next be described specifically.

In the present invention, a polymerizable composition comprising the compound (a) and at least two compounds (b) having tertiary amino group substituted with aliphatic and/or aromatic group(s) and being different in catalytic activity, a ratio of the tertiary amino group in the compounds (b) to the episulfide group in the compound (a) being in the range of from 0.0001 to 0.02, preferably from 0.0002 to 0.01 has a sufficiently long pot life and can suppress heat release upon polymerization. A resin obtained therefrom is improved in hue and reduced in yellowing upon post-heating, without impairing a high refractive index and a high Abbe number. In addition, when lenses are mass-produced, formation of striae inside of the lenses can be suppressed, whereby a lowering in a yield due to striae can be prevented.

Moreover, in the present invention, a polymerizable composition comprising the above-described compound (c) and one or more than one compound (d) having a tertiary amino group substituted with aliphatic and/or aromatic group(s), a ratio of the tertiary amino group in the compound (d) to an episulfide group in the compound (c) being in the range of 0.0001 to 0.02 has a sufficiently long pot life and can suppress heat release upon polymerization. The resin obtained therefrom is improved in hue and is reduced in yellowing upon post-heating, while maintaining a high refractive index and a high Abbe number.

Specific examples of the compound having a tertiary amino group as (b) or (d) in the present invention include, but not limited to, aliphatic and aromatic tertiary amines such as triethylamine, tri-n-butylamine, tri-n-hexylamine, N,N-diisopropylethylamine, triethylenediamine, triphenylamine, N,N-dimethylethanolamine, N,N-diethylethanolamine, N,N-dibutylethanolamine, triethanolamine, N-ethyldiethanolamine, N,N-dimethylbenzylamine, N,N-diethylbenzylamine, tribenzylamine, N-methyldibenzylamine, N,N-dimethylcyclohexylamine, N,N-diethylcyclohexylamine, N,N-dimethylbutylamine, N-methyldicyclohexylamine, N-methylmorpholine, N-isopropylmorpholine, pyridine, quinoline, N,N-dimethylaniline, N,N-diethylaniline, α-, β- or γ-picoline, 2,2'-bipyridyl, 1,4-dimethylpiperazine, dicyandiamide, tetramethylethylenediamine, hexamethylenetetramine, 1,8-diazabicyclo[5.4.0]-7-undecene, and 2,4,6-tris(N,N-dimethylaminomethyl)phenol.

Among these exemplified compounds, preferred are N,N-diisopropylethylamine, N-methyldicyclohexylamine, N,N-dimethylcyclohexylamine and N,N-diethylethanolamine. Use of a mixture of at least two tertiary amines different in catalytic activity as the compounds (b) brings about good results.

Although it is impossible to limit combination of tertiary amines, as the compounds (b), different in catalytic activity in a wholesale manner, because it may depend on the kind of the compound (a) or the kind of a resin modifier to be described later, preferred examples include the combination of N,N-dimethylcyclohexylamine and N-methyldicyclohexylamine, that of N,N-dimethylcyclohexylamine and N,N-diisopropylethylamine and that of N,N-diethylethanolamine and N-methyldicyclohexylamine, each combination comprising the compounds selected respectively from two groups, that is, a high-catalytic-activity group such as N,N-dimethylcyclohexylamine and N,N-diethylethanolamine and a low-catalytic-activity group such as N,N-diisopropylethylamine and N-methyldicyclohexylamine.

Specific examples of the compound (a) usable in the present invention as a raw material include, but not limited to, linear aliphatic β-epithiopropylthio compounds such as bis(β-epithiopropyl)sulfide, bis(β-epithiopropyl)disulfide, bis(β-epithiopropylthio)methane, 1,2-bis(β-epithiopropylthio)ethane, 1,2-bis(β-epithiopropylthio)propane, 1,3-bis(β-epithiopropylthio)propane, 1,3-bis(β-epithiopropylthio)-2-methylpropane, 1,4-bis(β-epithiopropylthio)butane, 1,4-bis(β-epithiopropylthio)-2-methylbutane, 1,3-bis(β-epithiopropylthio)butane, 1,5-bis(β-epithiopropylthio)pentane, 1,5-bis(β-epithiopropylthio)-2-methylpentane, 1,5-bis(β-epithiopropylthio)-3-thiapentane, 1,6-bis(β-epithiopropylthio)hexane, 1,6-bis(β-epithiopropylthio)-2-methylhexane, 3,8-bis(β-epithiopropylthio)-3,6-dithiaoctane, 1,2,3-tris(β-epithiopropylthio)propane, 2,2-bis(β-epithiopropylthiomethyl)-1,3-bis(β-epithiopropylthio)propane, 2,2-bis(β-epithiopropylthiomethyl)-1-(β-epithiopropylthio)butane, 1,5-bis(β-epithiopropylthio)-2-(β-epithiopropylthiomethyl)-3-thiapentane, 1,5-bis(β-epithiopropylthio)-2,4-bis(β-epithiopropylthiomethyl)-3-thiapentane, 1-(β-epithiopropylthio)-2,2-bis(β-epithiopropylthiomethyl)-4-thiahexane, 1,8-bis(β-epithiopropylthio)-4-(β-epithiopropylthiomethyl)-3,6-dithiaoctane, 1,8-bis(β-epithiopropylthio)-4,5-bis(β-epithiopropylthiomethyl)-3,6-dithiaoctane, 1,8-bis(β-epithiopropylthio)-4,4-bis(β-epithiopropylthiomethyl)-3,6-dithiaoctane, 1,8-bis(β-epithiopropylthio)-2,5-bis(β-epithiopropylthiomethyl)-3,6-dithiaoctane, 1,8-bis(β-epithiopropylthio)-2,4,5-tris(β-epithiopropylthiomethyl)-3,6-dithiaoctane, 1,1,1-tris{[2-(β-epithiopropylthio)ethyl]thiomethyl}-2-β-epithiopropylthio)ethane, 1,1,2,2-tetrakis{[2-(β-epithiopropylthio)ethyl]thiomethyl}ethane, 1,11-bis(β-epithiopropylthio)-4,8-bis(β-epithiopropylthiomethyl)-3,6,9-trithiaundecane, 1,11-bis(β-epithiopropylthio)-4,7-bis(β-epithiopropylthiomethyl)-3,6,9-trithiaundecane and 1,11-bis(β-epithiopropylthio)-5,7-bis(β-epithiopropylthiomethyl)-3,6,9-trithiaundecane; cyclic aliphatic β-epithiopropylthio compounds such as 1,3-bis(β-epithiopropylthio)cyclohexane, 1,4-bis(β-epithiopropylthio)-cyclohexane, 1,3-bis(β-epithiopropylthiomethyl)-cyclohexane, 1,4-bis(β-epithiopropylthiomethyl)-cyclohexane, 2,5-bis(β-epithiopropylthiomethyl)-1,4-dithiane and 2,5-bis{[2-(β-epithiopropylthio)ethyl]-thiomethyl}-1,4-dithiane; aromatic β-epithiopropylthio compounds such as 1,3-bis(β- epithiopropylthio)benzene, 1,4-bis(β-epithiopropylthio) benzene, 1,3-bis(β-epithiopropylthiomethyl)benzene, 1,4-bis(β-epithiopropylthiomethyl)benzene, bis[4-(β-epithiopropylthio)phenyl]-methane, 2,2-bis[4-(β-epithiopropylthio)phenyl]propane, bis[4-(β-epithiopropylthio)phenyl]sulfide, bis[4-(β-epithiopropylthio)phenyl]sulfone and 4,4,'-bis(β-epithiopropylthio)biphenyl; mercapto-containing epithio compounds such as 3-mercaptopropylene sulfide and 4-mercaptobutene sulfide; and bis(β-epithiopropyl)ether, bis (β-epithiopropyloxy)methane, 1,2-bis(β-epithiopropyloxy) ethane, 1,3-bis(β-epithiopropyloxy)propane, 1,2-bis(β-epithiopropyloxymethyl)propane, 1-(β-epithiopropyloxy)-2-(β-epithiopropyloxymethyl)propane, 1,4-bis(β-epithiopropyloxy)butane, 1,3-bis(β-epithiopropyloxy)-butane, 1-(β-epithiopropyloxy)-3-(β-epithiopropyloxymethyl)butane, 1,5-bis(β-epithiopropyloxy)pentane, 1-(β-epithiopropyloxy)-4-(β-epithiopropyloxymethyl)pentane, 1,6-bis(β-epithiopropyloxy)hexane, 1-(β-epithiopropyloxy)-5-(β-epithiopropyloxymethyl)hexane, 1-(β-epithiopropyloxy)-2-[(2-β-epithiopropyloxyethyl)oxy]ethane, 1-(β-epithiopropyloxy)-2-{[2-(2-β-epithiopropyloxyethyl)-oxyethyl]oxy}ethane, tetrakis(β-epithiopropyloxymethyl)-methane, 1,1,1-tris(β-epithiopropyloxymethyl)propane, 1,5-bis(β-epithiopropyloxy)-2-(β-epithiopropyloxymethyl)-3-thiapentane, 1,5-bis(β-epithiopropyloxy)-2,4-bis(β-epithiopropyloxymethyl)-3-thiapentane, 1-(β-epithiopropyloxy)-2,2-bis(β-epithiopropyloxymethyl)-4-thiahexane, 1,5,6-tris(β-epithiopropyloxy)-4-(β-epithiopropyloxymethyl)-3-thiahexane, 1,8-bis(β-epithiopropyloxy) -4-(β-epithiopropyloxymethyl)-3,6-dithiaoctane, 1,8- bis(β-epithiopropyloxy)-4,5-bis(β-epithiopropyloxymethyl)-3,6-dithiaoctane, 1,8-bis(β-epithiopropyloxy)-4,4-bis(βepithiopropyloxymethyl)-3,6-dithiaoctane, 1,8-bis(β-epithiopropyloxy)-2,4,5-tris(β-epithiopropyloxymethyl)-3,6-dithiaoctane, 1,8-bis(β-epithiopropyloxy)-2,5-bis(β-epithiopropyloxymethyl)-3,6-dithiaoctane, 1,9-bis(β-epithiopropyloxy)-5-(β-epithiopropyloxymethyl)-5-[(2-β-epithiopropyloxyethyl) oxymethyl]-3,7-dithianonane, 1,10-bis(β-epithiopropyloxy)-5,6-bis[(2-β-epithiopropyloxyethyl) oxy]-3,6,9-trithiadecane, 1,11-bis(β-epithiopropyloxy)-4,8-bis(β-epithiopropyloxymethyl)-3,6,9-trithiaundecane, 1,11-bis(β-epithiopropyloxy)-5,7-bis(β-epithiopropyloxymethyl)-3,6,9-trithiaundecane, 1,11-bis(β-epithiopropyloxy)-5,7-bis[(2-β-epithiopropyloxyethyl) oxymethyl]-3,6,9-trithiaundecane, 1,11-bis(β-epithiopropyloxy)-4,7-bis(β-epithiopropyloxymethyl)-3,6, 9-trithiaundecane, 1,3- and 1,4-bis(β-epithiopropyloxy) cyclohexane, 1,3- and 1,4-bis(β-epithiopropyloxymethyl) cyclohexane, bis[4-(β-epithiopropyloxy)-cyclohexyl] methane, 2,2-bis[4-(β-epithiopropyloxy)-cyclohexyl] propane, bis[4-(β-epithiopropyloxy)-cyclohexyl]sulfide, 2,5-bis(β-epithiopropyloxymethyl)-1,4-dithiane, 2,5-bis(β-epithiopropyloxyethyloxymethyl)-1,4-dithiane, 1,3- and 1,4-bis(β-epithiopropyloxy)benzene and 1,3- and 1,4-bis(β-epithiopropyloxymethyl)benzene. These compounds may be used either singly or in combination. It is preferred that each of these compounds (a) contains the episulfide group in an amount not less than 50 mole % based on total moles of the episulfide group and epoxy group.

As well as the above-exemplified episulfide compound, the polymerizable composition of the present invention may contain a polysulfide oligomer such as dimer, trimer or tetramer of the compound; a mercapto-containing episulfide resin which is formed when an epihalohydrin is insufficient upon synthesis of an episulfide resin; and/or an inorganic acid, organic acid, solvent or unreacted raw material which is employed upon synthesis of the episulfide compound; and organic compounds or inorganic compounds as byproducts or impurities within an extent not causing a problem.

To the polymerizable composition for lenses in the present invention, a resin modifier can be added with a view to improving the resin, mainly for adjusting optical properties such as refractive index of the resulting lens, various physical properties such as specific gravity, and viscosity of the composition, and for improving the handling ease.

Examples of the resin modifier include episulfide compounds other than those contained in the polymerizable composition of the present invention, epoxy compounds, olefins including (meth)acrylates, primary or secondary amine compounds, thiol compounds, polyphenolic compounds, amino acids and mercaptoamines, organic acids and anhydrides thereof, and mercapto-organic acids.

Preferred specific examples of the epoxy compound as a resin modifier include, but not limited to, phenolic epoxy compounds available by condensation of a polyvalent phenolic compound such as bisphenol A glycidyl ether with an epihalohydrin compound, alcoholic epoxy compounds available by condensation of a polyhydric alcohol compound such as hydrogenated bisphenol A glycidyl ether with an epihalohydrin compound, glycidyl ester epoxy compounds available by condensation of a polyvalent organic acid compound such as 3,4-epoxycyclohexylmethyl-3',4'-epoxycyclohexanecarboxylate or diglycidyl 1,2-hexahydrophthalate with an epihalohydrin compound, amine epoxy compounds available by condensation of a primary or secondary diamine compound with an epihalohydrin compound and aliphatic polyvalent epoxy compounds such as vinylcyclohexene diepoxide. These epoxy compounds may be used either singly or in combination.

Preferred specific examples of the olefin as a resin modifier include, but not limited to, (meth)acrylate compounds such as benzyl acrylate, benzyl methacrylate, butoxyethyl acrylate, butoxymethyl methacrylate, cyclohexyl acrylate, cyclohexyl methacrylate, 2-hydroxyethyl acrylate, hydroxymethyl methacrylate, glycidyl acrylate, glycidyl methacrylate, phenoxyethyl acrylate, phenoxyethyl methacrylate, phenyl methacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, neopentyl glycol dimethacrylate, ethylene glycol bisglycidyl acrylate, ethylene glycol bisglycidyl methacrylate, bisphenol A diacrylate, bisphenol A dimethacrylate, 2,2-bis(4-acryloxyethoxyphenyl)propane, 2,2-bis(4-methacryloxyethoxyphenyl)propane, 2,2-bis(4-acryloxydiethoxyphenyl)propane, 2,2-bis(4-methacryloxydiethoxyphenyl)-propane, bisphenol F diacrylate, bisphenol F dimethacrylate, 1,1-bis(4-acryloxyethoxyphenyl)methane, 1,1-bis(4-methacryloxyethoxyphenyl)methane, 1,1-bis(4-acryloxydiethoxyphenyl) methane, 1,1-bis(4-methacryloxydiethoxyphenyl)methane, dimethylol tricyclodecane diacrylate, trimethylolpropane triacrylate, trimethylolpropane trimethacrylate, glycerol diacrylate, glycerol dimethacrylate, pentaerythritol triacrylate, pentaerythritol tetraacrylate, pentaerythritol tetramethacrylate, methylthioacrylate, methylthiomethacrylate, phenylthioacrylate, benzylthiomethacrylate, xylylenedithiol diacrylate, xylylenedithiol dimethacrylate, mercaptoethylsulfide diacrylate and mercaptoethylsulfide dimethacrylate; allyl compounds such as allyl glycidyl ether, diallyl phthalate, diallyl terephthalate, diallyl isophthalate, diallyl carbonate and diethylene glycol bisallyl carbonate; vinyl compounds such as styrene, chlorostyrene, methylstyrene, bromostyrene, dibromostyrene, divinylbenzene and 3,9-divinylspirobi(m-dioxane); and diisopropenyl benzene. These olefins may be used either singly or in combination. Moreover, the above-exemplified resin modifiers may be used either singly or in combination.

Preferred specific examples of the primary or secondary amine compound as a resin modifier include, but not limited to, monofunctional primary amine compounds such as ethylamine, n-propylamine, isopropylamine, n-butylamine, sec-butylamine, tert-butylamine, pentylamine, hexylamine, heptylamine, octylamine, decylamine, laurylamine, myristylamine, 3-pentylamine, 2-ethyl-hexylamine, 1,2-dimethylhexylamine, allylamine, aminomethylbicycloheptane, cyclopentylamine, cyclohexylamine, 2,3-dimethylcyclohexylamine, aminomethylcyclohexane, aniline, benzylamine, phenetylamine, 2-, 3-, or 4-methylbenzylamine, o-, m-, or p-methylaniline, o-, m-, or p-ethylaniline, aminomorpholine, naphthylamine, furfurylamine, α-aminodiphenylmethane, toluidine, aminopyridine, aminophenol, aminoethanol, 1-aminopropanol, 2-aminopropanol, aminobutanol, aminopentanol, aminohexanol, methoxyethylamine, 2-(2-aminoethoxy)ethanol, 3-ethoxypropylamine, 3-propoxypropylamine, 3-butoxypropylamine, 3-isopropoxypropylamine, 3-isobutoxypropylamine and 2,2-diethoxyethylamine; primary polyamine compounds such as ethylenediamine, 1,2- or 1,3-diaminopropane, 1,2-, 1,3- or 1,4-diaminobutane, 1,5-diaminopentane, 1,6-diaminohexane, 1,7-diaminoheptane, 1,8-diaminooctane, 1,10-diaminodecane, 1,2-, 1,3- or 1,4-diaminocyclohexane, o-, m- or p-diaminobenzene, 3,4- or 4,4'-diaminobenzophenone, 3,4- or 4,4'-diaminodiphenylether, 4,4'-diaminodiphenylmethane, 4,4'-diaminodiphenylsulfide, 3,3'- or 4,4'-diaminodiphenylsulfone, 2,7-diaminofluorene, 1,5-, 1,8- or 2,3-diaminonaphthalene, 2,3-, 2,6- or 3,4-diaminopyridine, 2,4- or 2,6-diaminotoluene, m- or p-xylylenediamine, isophoronediamine, diaminomethylbicycloheptane, 1,3- or 1,4-diaminomethylcyclohexane, 2- or 4-aminopiperidine, 2- or 4-aminomethylpiperidine, 2- or 4-aminoethylpiperidine, N-aminoethylmorpholine and N-aminopropylmorpholine; monofunctional secondary amine compounds such as diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methylhexylamine, diallylamine, N-methylallylamine, piperidine, pyrrolidine, diphenylamine, N-methylamine, N-ethylamine, dibenzylamine, N-methylbenzylamine, N-ethylbenzylamine, dicyclohexylamine, N-methylaniline, N-ethylaniline, dinaphthylamine, 1-methylpiperazine and morpholine; and secondary polyamine compounds such as N,N'-dimethyl- ethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,5-diaminopentane, N,N'-diethyl-1,6-diaminohexane, N,N'-diethyl-1,7-diaminoheptane, piperazine, 2-methylpiperazine, 2,5-dimethylpiperazine, 2,6-dimethylpiperazine, homopiperazine, 1,1-di(4-piperidyl)methane, 1,2-di(4-piperidyl)ethane, 1,3-di(4-piperidyl)propane, 1,4-di(4-piperidyl)butane and tetramethylguanidine. They may be used either singly or in combination. Among these exemplified compounds, benzylamine and piperazines are more preferred.

Preferred specific examples of the thiol compound include, but not limited to, aliphatic thiols such as methylmercaptane, ethylmercaptane, 1,2-ethanedithiol, 1,2-propanedithiol, 1,3-propanedithiol, 2,2-propanedithiol, 1,4-butanedithiol, 1,2,3-trimercaptopropane, tetrakis(mercaptomethyl)methane, 1,2-dimercaptocyclohexane, bis(2-mercaptoethyl)sulfide, 2,3-dimercapto-1-propanol, ethylene glycol bis(3-mercaptopropionate), diethylene glycol bis(3-mercaptopropionate), diethylene glycol bis(2-mercaptoglycolate), pentaerythritol tetrakis(2-mercaptothioglycolate), pentaerythritol tetrakis(3-mercaptopropionate), trimethylolpropane tris(2-mercaptothioglycolate), trimethylolpropane tris(3-mercaptopropionate), 1,1,1-trimethylmercaptoethane, 1,1,1-trimethylmercaptopropane, 2,5-dimercaptomethylthiophene, 4-mercaptomethyl-1,8-dimercapto-3,6-dithiaoctane, 2,5-dimercaptomethyl-1,4-dithiane, 2,5-bis[(2-mercaptoethyl)thiomethyl]-1,4-dithiane, 1,3-cyclohexanedithiol, 1,4-cyclohexanedithiol, 4,8-dimercaptomethyl-1,11-dimercapto-3,6,9-trithiaundecane, 4,7-dimercaptomethyl-1,11-dimercapto-3,6,9-trithiaundecane and 5,7-dimercaptomethyl-1,11-dimercapto-3,6,9-trithiaundecane; and aromatic thiols such as benzylmercaptane, thiophenol, 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 2,2'-dimercaptobiphenyl, 4,4,'-dimercaptobiphenyl, bis(4-mercaptophenyl)methane, bis(4-mercaptophenyl)sulfide, bis(4-mercaptophenyl)sulfone, 2,2-bis(4-mercaptophenyl)propane, 1,2,3-trimercaptobenzene, 1,2,4-trimercaptobenzene and 1,2,5-trimercaptobenzene. They may be used either singly or in combination.

The polyphenolic compound is a compound having at least one phenolic hydroxyl group on their aromatic ring. Specific examples of the polyphenolic compound include, but not limited to, monophenols such as phenol, o-cresol, m-cresol, p-cresol, 3-methoxyphenol, 4-ethoxyphenol, 4-n-propoxyphenol, 3-butoxyphenol, nonylphenol, 2-n-propylphenol, 2,3,4,6-tetrachlorophenol, 2,3,5,6-tetrafluorophenol, 2,4,6-tribromophenol, 2,6-dichloro-4-fluorophenol, 2,6-dichloro-4-nitrophenol, 2,3,4-trichlorophenol, 4-bromo-2-chlorophenol, 2,4-dibromophenol, 2-chloro-4-nitrophenol, 2,3-dichlorophenol, 2-fluoro-4-nitrophenol, 3,5-xylenol, 2,3-difluorophenol, 2,4-dinitrophenol, 2-bromophenol, 2-amino-4-chloro-5-nitrophenol, 2-chlorophenol, 4-amino-2,6-dichlorphenol, 2-nitrophenol, 2-amino-4-nitrophenol, thymol, carbachol, α-naphthol and 2-aminophenol; and polyphenols such as catechol, 3-chlorocatechol, resorcin, hydroquinone, chlorohydroquinone, pyrogallol and phloroglucinol. They may be used either singly or in combination.

Preferred specific examples of the mercapto-organic acid include, but not limited to, thioglycolic acid, 3-mercaptopropionic acid, thioacetic acid, thiolactic acid, thiomalic acid and thiosalicylic acid. They may be used either singly or in combination.

Preferred specific examples of the organic acid or anhydride thereof include, but not limited to, thiodiglycolic acid, thiodipropionic acid, dithiodipropionic acid, phthalic anhydride, hexahydrophthalic anhydride, methylhexahydrophthalic anhydride, methyltetrahydrophthalic anhydride, methylnorbornenic anhydride, methylnorbornanic anhydride, maleic anhydride, trimellitic anhydride and pyromellitic anhydride. The may be used either singly or in combination.

As well as the above-exemplified resin modifier, various known additives such as internal mold releasing agent, photo stabilizer, ultraviolet absorber, antioxidant, dyestuff and/or filler may be added according to the using purpose within an extent not causing a problem.

A typical polymerization method for obtaining the resin (ex. plastic lens) of the present invention is casting polymerization. In this method, the polymerizable composition of the present invention is mixed with a resin modifier as needed and then, the resulting mixture is cast between molds supported by a gasket or tape. Degassing treatment as needed before or after casting does not cause any trouble.

Then, it may be subject to curing by heating in a heating apparatus such as an oven or in water, and then a polymerization product may be took out from the mold.

The polymerization method or conditions for obtaining the resin of the present invention cannot be generalized, since they depend on the amounts and types of ingredients such as curing catalysts as well as types and proportions of monomers.

Heat curing conditions for a polymerizable composition of the present invention poured into the mold significantly vary depending of various factors such as types of compounds (a) and (b), a type of the resin modifier and the shape of the mold and therefore cannot be specifically limited, but the composition may be typically cured at −50 to 200° C. for 0.1 to 100 hours. It may be cured keeping or gradually raising a temperature within a range of from 10 to 150° C. for 1 to 80 hours, providing good results.

In addition, the polymerizable composition of the present invention may be cured in a reduced time by irradiating ultraviolet rays or the like. At this time, a curing catalyst such as radical polymerization catalyst may be added.

Upon molding or forming of the resin of the present invention, similar to the known molding or forming method, various substances such as chain extenders, crosslinking agents, photo-stabilizers, ultraviolet absorbers, antioxidants, coloring preventives other than that added upon preparation of the resin of the present invention, dyestuffs, fillers, internal or external mold releasing agents, internal or external adhesion improving agents, and hydroxyl-containing compound as dye-affinity improving agents may be added, depending on a purpose.

The resin after removed from the mold may be annealed if necessary.

The resin according to the present invention can be formed or molded into products of various shapes by changing the mold to be used upon casting polymerization. It can be used, for example, as optical materials such as eyeglass lenses, camera lenses and light emitting diodes (LED) and also as transparent resins. It is particularly suited as optical materials such as eyeglass lenses and camera lenses.

The lens made of the optical material of the present invention can be, if necessary, subjected to physical or chemical treatments such as surface abrasion, antistatic treatment, hard coating, anti-reflection coating treatment or dyeing treatment in order to prevent reflection, impart high hardness, improve abrasion resistance, improve chemical resistance, impart antifoggy property or make it fashionable.

The present invention will hereinafter be described more specifically by Examples. It should be noted that among the performances of the resulting resin tested, the refractive index, Abbe number, heat resistance, resin hue, pot life and heat release degree during polymerization were evaluated by the testing methods which will be described below.

Refractive index (nd), Abbe number (vd): this was determined at 20° C. by a Pulfrich refractometer.

Heat resistance: Tg was determined by the TMA penetrating method (load: 50 g, pin point: 0.5 mmφ, heating at 10° C./min, 150° C./max).

Hue: a yellowness index (which will hereinafter be abbreviated as "YI") of a flat plate which had been made of a resin to have a thickness of 9 mm was determined by a color differential calorimeter (product of Minolta Co., Ltd.). In the tables of Examples, ΔYI means a value obtained by subtracting the hue of the resin after completion of the polymerization from the hue of a resin after heat treatment at 120° C. for 3 hours. The value thus obtained stands for a changing amount of the hue.

Pot life: a polymerizable composition was lagged in a water bath of 30° C. and after 7 hours, its viscosity was measured by a Brookfield viscometer. When the viscosity after 7 hours was 100 mPa·S or less, the polymerizable composition was evaluated as "A". When the viscosity was 150 mPa·S or less, the composition was evaluated as "B". The polymerizable composition which had been gelled or resinified was evaluated as "C".

Measurement of heat release degree during polymerization: the temperature of a resin was measured during polymerization by using a thermocouple thermometer equipped with a recorder and the value obtained by subtracting the temperature of the polymerizing oven from the temperature of the resin was designated as heat release degree.

Judgment of striae: 100 resin pieces were prepared and exposed to a high-pressure mercury lamp. The existence or absence of striae was visually observed and a yield was calculated.

In Examples and Comparative Examples, bis(2,3-epithiopropyl)disulfide (which will hereinafter be called "Compound (A)") was employed as the compound (a) or (c), and benzylamine (which will hereinafter be called "Modifier (A)") or 4,8-dimercaptomethyl-1,11-mercapto-3,6,9-trithiaundecane (which will hereinafter be called "Modifier (B)") was added as a modifier.

EXAMPLE 1

Compound (A) (7000 g) as the compound (a), 1.4 g of N,N-dimethylcyclohexylamine (hereinafter be abbreviated as "DCA") and 7 g of N,N-dicyclohexylmethylamine (hereinafter be abbreviated as "DCH") as the compounds (b), and 700 g of Modifier (B) as a resin modifier were mixed under stirring, followed by degassing for 1 hour under reduced pressure. After filtration through a 3 μm Teflon filter, the residue was cast, in equal portions, into 100 molds each made of a glass mold and a gasket over 4 hours. The molds were lagged at 30° C. for 10 hours and then gradually heated from 30 to 80° C., at which polymerization was conducted for 20 hours. After completion of the polymerization, the resulting resin was released from each of the molds by gradual cooling. The resin was annealed at 120° C. for 3 hours, whereby 100 resin pieces were obtained. The physical properties and hue of the resin, the pot life of the polymerizable composition and the yield influenced by striae are shown in Table 1.

EXAMPLE 2

Compound (A) (7000 g) as the compound (c), 14 g of DCA as the compound (d) and 700 g of Modifier (B) as a resin modifier were mixed under stirring, followed by degassing for 1 hour under reduced pressure. After filtration through a 3 μm Teflon filter, the residue was cast, in equal portions, into 100 molds each made of a glass mold and a gasket over 4 hours. The molds were lagged at 30° C. for 10 hours and then gradually heated from 30 to 80° C., at which polymerization was conducted for 20 hours. After completion of the polymerization, the resulting resin was released from each of the molds by gradual cooling. The resin was annealed at 120° C. for 3 hours, whereby 100 resin pieces were obtained. The physical properties and hue of the resin, the pot life of the polymerizable composition and the yield influenced by striae are shown in Table 1.

EXAMPLE 3

Compound (A) (7000 g) as the compound (c), 14 g of DCA as the compound (d) and 350 g of Modifier (B) as a resin modifier were mixed under stirring, followed by degassing for 1 hour under reduced pressure. After filtration through a 3 μm Teflon filter, the residue was cast, in equal portions, into 100 molds each made of a glass mold and a gasket over 4 hours. The molds were lagged at 30° C. for 10 hours and then gradually heated from 30 to 80° C., at which polymerization was conducted for 20 hours. After completion of the polymerization, the resulting resin was released from each of the molds by gradual cooling. The resin was annealed at 120° C. for 3 hours, whereby 100 resin pieces were obtained. The physical properties and hue of the resin, the pot life of the polymerizable composition and the yield influenced by striae are shown in Table 1.

TABLE 1

| Example | 1 | 2 | 3 |
|---|---|---|---|
| Compound (a) or (c) | (A) | (A) | (A) |
| Compound (b) or (d) | DCA/DCH | DCA | DCA |
| Resin modifier | (B) | (B) | (B) |
| Amino/episulfide, a molar ratio of functional group | 0.0007 | 0.0017 | 0.0017 |
| Refractive index Nd | 1.734 | 1.734 | 1.736 |
| Abbe Number vd | 34 | 34 | 33 |
| Heat resistance (Tg: ° C.) | 81 | 81 | 89 |
| ΔYI | 1.9 | 1.9 | 5.0 |
| Pot life 30° C. × 7 hrs. | A | A | A |
| Heat release Degree ° C. | 20–25 | 35 | 40 |
| Yield (%) | 95 | 50 | 50 |

EXAMPLE 4

Compound (A) (100 g) as the compound (a), 0.02 g of DCA and 0.1 g of DCH as the compounds (b), and 5 g of Modifier (A) as a resin modifier were mixed under stirring, followed by degassing for 0.4 hour under reduced pressure. After filtration through a 3 μm Teflon filter, the residue was cast into a mold made of a glass mold and a gasket. The mold was lagged at 30° C. for 10 hours and then gradually heated from 30 to 80° C., at which polymerization was conducted for 20 hours. After completion of the polymerization, the resulting resin was released from the mold by gradual cooling. The resin was annealed at 120° C. for 3 hours and its physical properties were measured. The physical properties and hue of the resin and the pot life of the polymerizable composition are shown in Table 2.

EXAMPLE 5

In a similar manner to Example 4 except for the use of 0.02 g of DCA and 0.5 g of N,N-diisopropylethylamine (hereinafter abbreviated as "DIPEAI") as the compounds (b), an operation was carried out. The physical properties and hue of the resin and the pot life of the polymerizable composition are shown in Table 2.

EXAMPLE 6

In a similar manner to Example 4 except for the use of 0.02 g of DCA and 0.5 g of DCH as the compounds (b), an operation was carried out. The physical properties and hue of the resin and the pot life of the polymerizable composition are shown in Table 2.

EXAMPLE 7

In a similar manner to Example 4 except for the use of 0.05 g of N,N-diethylethanolamine (which will hereinafter be abbreviated as "DEEA") and 0.5 g of DCH as the compounds (b), an operation was carried out. The physical properties and hue of the resin and the pot life of the polymerizable composition are shown in Table 2.

EXAMPLE 8

In a similar manner to Example 4 except for the use of 10 g of Modifier (B) as a resin modifier, an operation was carried out. The physical properties and hue of the resin and the pot life of the polymerizable composition are shown in Table 2.

EXAMPLE 9

In a similar manner to Example 5 except for the use of 10 g of Modifier (B) as a resin modifier, an operation was carried out. The physical properties and hue of the resin and the pot life of the polymerizable composition are shown in Table 2.

EXAMPLE 10

In a similar manner to Example 6 except for the use of 10 g of Modifier (B) as a resin modifier, an operation was carried out. The physical properties and hue of the resin and the pot life of the polymerizable composition are shown in Table 2.

EXAMPLE 11

In a similar manner to Example 7 except for the use of 10 g of Modifier (B) as a resin modifier, an operation was carried out. The physical properties and hue of the resin and the pot life of the polymerizable composition are shown in Table 2.

TABLE 2

|  | Example | | | | | | | |
| --- | --- | --- | --- | --- | --- | --- | --- | --- |
|  | 4 | 5 | 6 | 7 | 8 | 9 | 10 | 11 |
| Compound (a) | (A) | (A) | (A) | (A) | (A) | (A) | (A) | (A) |
| Compound (b) | DCA/DCH | DCA/DIPEA | DCA/DCH | DEEA/DCH | DCA/DCH | DCA/DIPEA | DCA/DCH | DEEA/DCH |
| Resin modifier | (A) | (A) | (A) | (A) | (B) | (B) | (B) | (B) |
| Amino/episulfide, a molar ratio of functional group | 0.0007 | 0.00042 | 0.0029 | 0.0031 | 0.0007 | 0.0042 | 0.0029 | 0.0031 |
| Refractive index Nd | 1.728 | 1.725 | 1.726 | 1.727 | 1.734 | 1.733 | 1.733 | 1.733 |
| Abbe Number vd | 33 | 33 | 34 | 33 | 34 | 34 | 34 | 34 |
| Heat resistance (Tg: ° C.) | 79 | 81 | 81 | 81 | 79 | 81 | 79 | 79 |
| ΔYI | 7.2 | 4.3 | 5.7 | 6.8 | 2.5 | 2.5 | 2.1 | 2.5 |
| Pot life 30° C. × 7 hrs. | A | A | A | A | A | A | A | A |
| Heat release Degree ° C. | 25–30 | 10 | 25–30 | 25 | 20–25 | 10 | 25–30 | 30 |

EXAMPLE 12

Compound (A) (100 g) as the compound (c), 0.5 g of DIPEA as the compound (d) and 5 g of Modifier (A) as a resin modifier were mixed under stirring, followed by degassing for 0.4 hour under reduced pressure. After filtration through a 3 μm Teflon filter, the residue was cast into a mold made of a glass mold and a gasket. The mold was lagged at 30° C. for 10 hours and then gradually heated from 30 to 80° C., at which polymerization was conducted for 20 hours. After completion of the polymerization, the resulting resin was released from the mold by gradual cooling. The resin was annealed at 120° C. for 3 hours and its physical properties were measured. The physical properties and hue of the resin and pot life of the polymerizable composition are shown in Table 3.

EXAMPLE 13

In a similar manner to Example 12 except for the use of 0.5 g of DCH instead of DIPEA as the compound (d), an operation was carried out. The physical properties and hue of the resin and the pot life of the polymerizable composition are shown in Table 3.

EXAMPLE 14

In a similar manner to Example 12 except for the use of 0.5 g of DEEA instead of DIPEA as the compound (d), an operation was carried out. The physical properties and hue of the resin and the pot life of the polymerizable composition are shown in Table 3.

EXAMPLE 15

In a similar manner to Example 12 except for the use of 0.2 g of DCA instead of DIPEA as the compound (d), an operation was carried out. The physical properties and hue of the resin and the pot life of the polymerizable composition are shown in Table 3.

EXAMPLE 16

In a similar manner to Example 12 except for the use of 10 g of Modifier (B) as a resin modifier, an operation was carried out. The physical properties and hue of the resin and the pot life of the polymerizable composition are shown in Table 3.

EXAMPLE 17

In a similar manner to Example 13 except for the use of 10 g of Modifier (B) as a resin modifier, an operation was carried out. The physical properties and hue of the resin and the pot life of the polymerizable composition are shown in Table 3.

EXAMPLE 18

In a similar manner to Example 14 except for the use of 10 g of Modifier (B) as a resin modifier, an operation was carried out. The physical properties and hue of the resin and pot life of the polymerizable composition are shown in Table 3.

EXAMPLE 19

In a similar manner to Example 15 except for the use of 10 g of Modifier (B) as a resin modifier, an operation was carried out. The physical properties and hue of the resin and the pot life of the polymerizable composition are shown in Table 3.

TABLE 3

| | Example | | | | | | | |
|---|---|---|---|---|---|---|---|---|
| | 12 | 13 | 14 | 15 | 16 | 17 | 18 | 19 |
| Compound (c) | (A) | (A) | (A) | (A) | (A) | (A) | (A) | (A) |
| Compound (d) | DIPEA | DCH | DEEA | DCA | DIPEA | DCH | DEEA | DCA |
| Resin modifier | (A) | (A) | (A) | (A) | (B) | (B) | (B) | (B) |
| Amino/episulfide, a molar ratio of functional group | 0.0041 | 0.0026 | 0.0045 | 0.0017 | 0.0041 | 0.0026 | 0.0045 | 0.0017 |
| Refractive index Nd | 1.725 | 1.726 | 1.727 | 1.728 | 1.733 | 1.733 | 1.734 | 1.734 |
| Abbe Number vd | 33 | 34 | 33 | 34 | 34 | 34 | 34 | 34 |
| Heat resistance (Tg: ° C.) | 81 | 81 | 81 | 81 | 79 | 81 | 79 | 81 |
| ΔYI | 4.3 | 5.7 | 6.8 | 6.5 | 2.5 | 2.1 | 2.5 | 1.9 |
| Pot life 30° C. × 7 hrs | A | A | A | A | A | A | A | A |
| Heat release Degree ° C. | 10 | 25–30 | 30 | 35 | 10 | 20–25 | 30 | 35 |

Comparative Example 1

Compound (A) (100 g), a catalyst composed of 1.5 g of DCA and 3.0 g of DCH, and 10 g of Modifier (B) as a resin modifier were mixed under stirring, followed by degassing for 0.4 hour under reduced pressure. After filtration through a 3 μm Teflon filter, the residue was cast into a mold made of a glass mold and a gasket. The mold was lagged at 30° C. for 10 hours and then gradually heated from 30 to 80° C., at which polymerization was conducted for 20 hours. After completion of the polymerization, the resulting resin was removed from the mold by gradual cooling. The resin was annealed at 120° C. for 3 hours and its physical properties were measured. The physical properties and hue of the resin and the pot life of the polymerizable composition are shown in Table 4. However, the yellowing of the resin was marked and concerning the pot life, severe heat release occurred and the polymerizable composition was resinified after about 3 hours.

Comparative Example 2

Compound (A) (100 g), 2.5 g of a catalyst composed solely of DCA and 5 g of Modifier (A) as a resin modifier were mixed under stirring, followed by degassing for 0.4 hour under reduced pressure. After filtration through a 3 μm Teflon filter, the residue was cast into a mold made of a glass mold and a gasket. The mold was lagged at 30° C. for 10 hours and then gradually heated from 30 to 80° C., at which polymerization was conducted for 20 hours. After completion of the polymerization, the resulting resin was removed from the mold by gradual cooling. The resin was annealed at 120° C. for 3 hours and its physical properties were measured. The physical properties and hue of the resin and the pot life of the polymerizable composition are shown in Table 4. The resulting resin, however, had a deteriorated refractive index and deteriorated heat resistance. Moreover, the pot life was short and after 5 hours, the polymerizable composition was gelled while releasing heat. Thus, satisfactory results were not attained.

Comparative Example 3

In a similar manner to Comparative Example 1 except for the use of 0.001 g of a catalyst composed solely of DCA, an operation was carried out. The physical properties and hue of the resin and the pot life are shown in Table 4. Polymerization however did not proceed sufficiently, leading to a deterioration in optical properties.

Comparative Example 4

In a similar manner to Comparative Example 2 except for the use of 2.0 g of a catalyst composed solely of triethylamine (which will hereinafter be abbreviated as "TEA") instead of DCA, an operation was carried out. The physical properties and hue of the resulting resin and the pot life are shown in Table 4. However, the yellowing of the resin was marked and concerning the pot life, severe heat release occurred and the polymerizable composition was resinified after about 4 hours.

Comparative Example 5

In a similar manner to Comparative Example 2 except for the use of 0.009 g of a catalyst composed solely of TEA instead of DCA, an operation was carried out. The physical properties and hue of the resulting resin and the pot life are shown in Table 4. Polymerization however did not proceed sufficiently, leading to a deterioration in optical properties.

Comparative Example 6

In a similar manner to Comparative Example 2 except for the use of 10 g of Modifier (B) instead of Modifier (A) as a resin modifier, an operation was carried out. The physical properties and hue of the resulting resin and the pot life are shown in Table 4. However, yellowing of the resulting resin was severe and concerning the pot life, the polymerizable composition was gelled while releasing heat after 5 hours and satisfactory results were not available.

Comparative Example 7

In a similar manner to Comparative Example 2 except for the use of 10 g of Modifier (B) instead of Modifier (A) as a resin modifier, and 0.01 g of a catalyst composed solely of DCA, an operation was carried out. The physical properties and hue of the resulting resin and the pot life are shown in Table 4. Polymerization however did not proceed sufficiently, leading to a deterioration in optical properties.

Comparative Example 8

In a similar manner to Comparative Example 2 except for the use of 10 g of Modifier (B) instead of Modifier (A) as a resin modifier, and 2.0 g of a catalyst composed solely of TEA instead of DCA, an operation was carried out. The physical properties and hue of the resulting resin and the pot life are shown in Table 4. However, yellowing of the resin was marked and concerning the pot life, the polymerizable composition was resinified after about 5 hours while releasing heat.

Comparative Example 9

In a similar manner to Comparative Example 2 except for the use of 10 g of Modifier (B) instead of Modifier (A) as a resin modifier, and 0.009 g of a catalyst composed solely of TEA instead of DCA, an operation was carried out. The physical properties and hue of the resulting resin and the pot life are shown in Table 4. Polymerization however did not proceed sufficiently, leading to a deterioration in optical properties.

TABLE 4

|  | Comparative Example | | | | | | | | |
|---|---|---|---|---|---|---|---|---|---|
|  | 1 | 2 | 3 | 4 | 5 | 6 | 7 | 8 | 9 |
| Compound (a) or (c) | (A) | (A) | (A) | (A) | (A) | (A) | (A) | (A) | (A) |
| Compound (b) or (d) | DCA/DCH | DCA | DCA | TEA | TEA | DCA | DCA | TEA | TEA |
| Resin modifier | (B) | (A) | (A) | (A) | (A) | (B) | (B) | (B) | (B) |
| Amino/episulfide, a molar ratio of functional group | 0.0271 | 0.0210 | 0.00008 | 0.0210 | 0.00009 | 0.0210 | 0.00008 | 0.0210 | 0.00009 |
| Refractive index Nd | 1.732 | 1.725 | 1.721 | 1.724 | 1.721 | 1.733 | 1.730 | 1.732 | 1.732 |
| Abbe Number νd | 33 | 33 | 33 | 33 | 33 | 33 | 33 | 33 | 33 |
| Heat resistance (Tg: ° C.) | 75.3 | 76.9 | 60.3 | 75.3 | 59.4 | 76.3 | 59.8 | 74.6 | 58.5 |
| ΔYI | 15.6 | 15.0 | 17.3 | 20.5 | 21.3 | 8.5 | 13.4 | 9.5 | 15.1 |
| Pot life 30° C. × 7 hrs. | C | C | A | C | A | C | A | C | A |
| Heat release Degree ° C. | 100 | 100 | 10 | 100 | 25 | 80 | 10 | 100 | 20 |

What is claimed is:

1. A polymerizable composition comprising a compound (a) having at least one structure represented by the following formula (1):

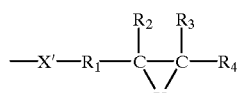

(1)

wherein $R_1$ is a divalent hydrocarbon group having 1 to 10 carbon atoms, $R_2$, $R_3$ and $R_4$ each independently represents a hydrocarbon group having 1 to 10 carbon atoms or a hydrogen atom; X stands for an S or O atom and the average number of S atom is at least 50% based on the total number of S and O atoms which consist of the three membered ring; and X' is —S— or —O—, at least two compounds (b) having a tertiary amino group substituted with aliphatic and/or aromatic group(s), which are each different in catalytic activity as a polymerization catalyst, with the proviso that the ratio of the total of the tertiary amino groups in the at least two compounds (b) to the episulfide groups in compound (a) is in the range of 0.0001 to 0.02 in terms of a molar ratio of amino/episulfide functional group.

2. The polymerizable composition according to claim 1, wherein the compound (a) has at least one structure represented by the following formula (2):

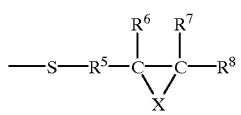

(2)

wherein, $R^5$ represents a divalent hydrocarbon group having 1 to 10 carbon atoms, $R^6$, $R^7$ and $R^8$ each independently represents a hydrocarbon group having 1 to 10 carbon atoms or a hydrogen atom, and X stands for an S or O atom, the average number of the S atom being at least 50% based on the total number of S and O atoms which constitute the three-membered ring.

3. The polymerizable composition according to claim 1, wherein the compound (a) is represented by the following formula (3):

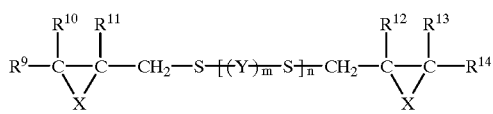
(3)

wherein, $R^9$ to $R^{14}$ each independently represents a hydrocarbon group having 1 to 10 carbon atoms or a hydrogen atom, Y represents a substituted or unsubstituted, linear or branched divalent hydrocarbon group having 1 to 10 carbon atoms, a substituted or unsubstituted 1,4-dithian group or an arylene group, m stands for an integer of 0 to 2, n stands for an integer of 0 to 4, and Xs each stands for an S or O atom.

4. The polymerizable composition according to claim 1, wherein the compound (a) is represented by the following formula (4):

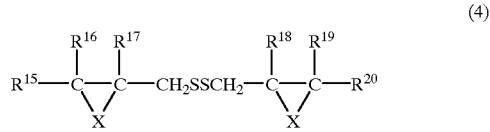
(4)

wherein, $R^{15}$ to $R^{20}$ each independently represents a hydrocarbon group having 1 to 10 carbon atom or a hydrogen atom, and Xs each stands for an S or O atom.

5. The polymerizable composition according to claim 1, wherein the tertiary-amino-containing compounds (b) used as a polymerization catalyst and different each other in catalytic activity are at least two compounds selected, respectively, from compounds having high catalytic activity consisting of N,N-dimethylcyclohexylamine and N,N-diethylethanolamine and those having low catalytic activity consisting of N,N-diisopropylethylamine and N-methyldicyclohexylamine.

6. A resin obtained by heat curing the polymerizable composition as claimed in claim 1.

7. A process for producing a resin, which comprises heat curing the polymerizable composition as claimed in claim 1.

8. An optical material comprising the resin as claimed in claim 6.

9. A process for producing an optical material, which comprises casting polymerization of the polymerizable composition as claimed in claim 1.

\* \* \* \* \*